United States Patent [19]
Cox

[11] 3,957,068
[45] May 18, 1976

[54] QUICK DETACHABLE ESCAPE FASTENER

[76] Inventor: William F. Cox, Grifton, N.C. 28530

[22] Filed: Mar. 10, 1975

[21] Appl. No.: 556,916

[52] U.S. Cl. ................ 135/15 CF; 24/243 K; 38/102.91; 49/141; 49/466; 150/52 R; 160/392; 160/395; 296/23 A; 296/27
[51] Int. Cl.² ............... A45F 1/12; E05B 65/10
[58] Field of Search ............... 24/243 K, 243 N; 135/15 CF; 160/392, 395; 38/102.91; 150/52 R; 296/23 A; 49/141, 466

[56] References Cited
UNITED STATES PATENTS

| | | |
|---|---|---|
| 2,245,961 | 6/1941 | Clay .................... 160/395 |
| 3,060,985 | 10/1962 | Vavce et al. ............ 24/243 K |
| 3,090,646 | 5/1963 | Johnson ................ 160/392 |
| 3,205,547 | 9/1965 | Riekse ................. 24/243 K |
| 3,266,711 | 8/1966 | Song ................... 24/243 K |
| 3,371,702 | 3/1968 | Keegan et al. .......... 160/395 |
| 3,421,276 | 1/1969 | La Barge ............... 160/395 |
| 3,700,019 | 10/1972 | Robbins et al. ......... 24/243 K |
| 3,803,671 | 4/1974 | Stuppy et al. .......... 24/243 K |
| 3,851,848 | 12/1974 | Wiele .................. 24/243 K |

FOREIGN PATENTS OR APPLICATIONS

| | | |
|---|---|---|
| 107,163 | 7/1965 | Norway ................. 49/466 |

*Primary Examiner*—Werner H. Schroeder
*Assistant Examiner*—Conrad L. Berman
*Attorney, Agent, or Firm*—Revere B. Gurley

[57] ABSTRACT

The fabric end wall of a camper is fastened to the outer side of a frame member by a fastener detachable from inside the camper, to provide an escape opening in an emergency. The fastener comprises a pair of slotted tubular fastener elements on the outer side of the frame receiving a folded edge of the fabric wall and a flexible element in the fold and tubular elements to secure the edge of the fabric wall, the flexible element being accessible at its central portion for withdrawal to release the fabric wall.

5 Claims, 5 Drawing Figures

QUICK DETACHABLE ESCAPE FASTENER

This invention relates to a camping unit, and especially to a camper mounted on a trailer and expandable from a closed condition to an extended, open position. These campers customarily have fabric sides and ends with the fabric or other flexible material fastened directly to body or frame members.

The object of this invention is to provide for unfastening the fabric or flexible material at one point to allow an opening for escape in case of emergency. As an example, most of these campers have an extension at one end to form a bed, and the top, sides and end wall of flexible material enclose and protect this bed. The door of the camper is usually in the center of the body, so that if fire occurs in the central area, or other emergency arises to close off the door, escape from the bed becomes impossible. Applicant provides for escape from this extended portion or the bed therein by providing a detachable fastening for a fabric side or end wall, which an occupant may quickly unfasten to provide an exit opening.

In the specific form of the invention shown, the end wall of the extended portion, which is flexible material such as fabric and may also include a screened portion, is secured to the frame on the end by a single element which may be quickly removed by pulling it out of engagement from one point, leaving the fabric end wall detached from the frame member.

Figure 1:
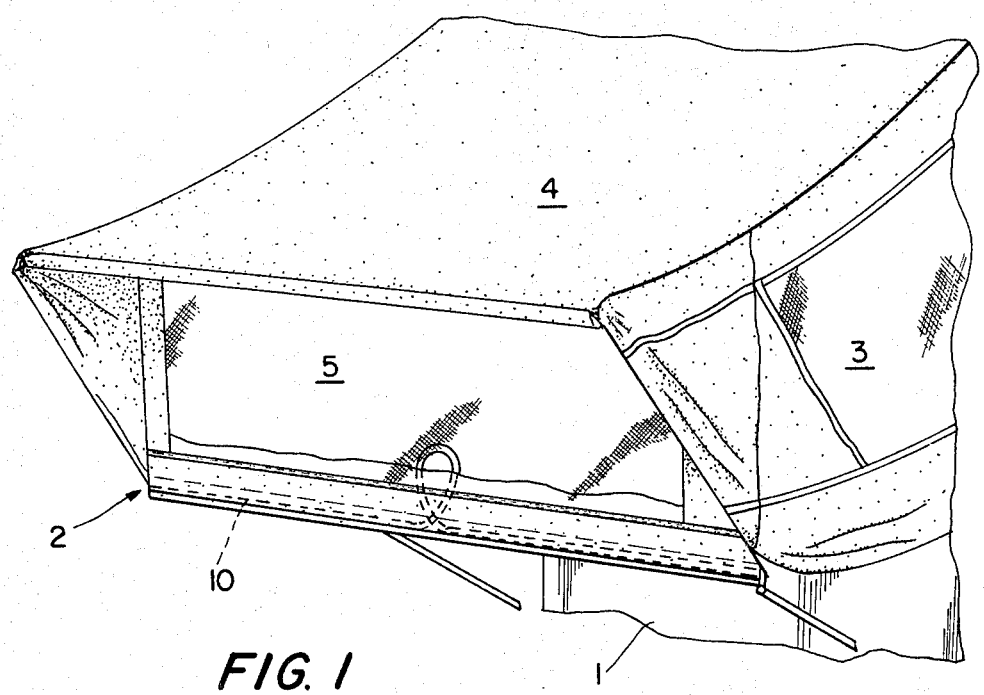
FIG. 1 shows a fragmentary end of the camper in its expanded condition, with the fabric wall on the end.
Figure 2:
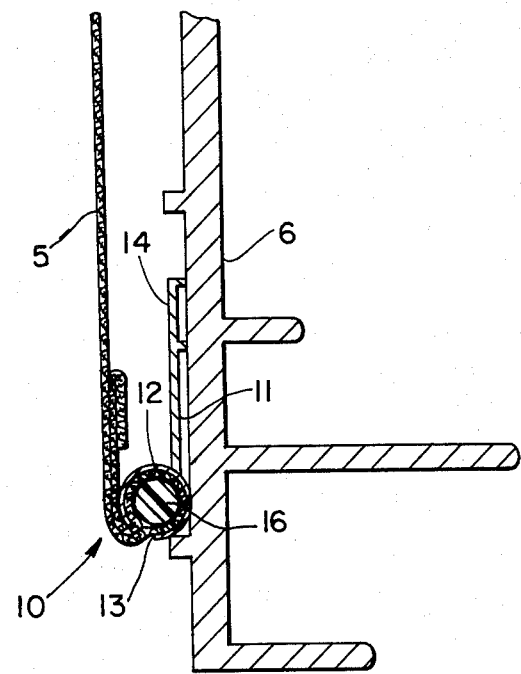
FIG. 2 shows a cross section of the frame member and end wall connected thereto.

The camper shown in FIG. 1 forms a shelter of known structure in which the body 1 is mounted on wheels, with an extended portion 2 forming a bed in the interior. Flexible side walls 3 and top 4 protect the bed, with a flexible end wall 5 closing the interior space. This wall 5 may be fabric or screen, and has a fabric margin along its bottom edge. This bottom edge is fastened to the outer side of the frame member 6 of the extended portion by fastening means generally indicated at 10.

For receiving the edge of the flexible fabric wall, two spaced fastener elements 11 are fastened to the outer surface of frame member 6. Each of these elements 11 may be formed as a slotted tube or formation 12, having a slot 13, and a flange 14 for securing to frame member 6. These two slotted elements extend along the frame member 14, separated by a central space.

The edge of the flexible fabric wall is folded to form a tubular edge portion 15 which may fit in the tubular elements 12. This fabric edge is fastened in the tubular elements by a flexible securing member 16 inserted in the tubular fabric edge 15 in the tubular elements 12, so that the fabric edge cannot be removed through the slots. The tubular fabric edge has an opening at its center where the tubular elements 12 are spaced, and the flexible securing member 16 is formed in a loop 17 at this point on the interior of the end wall 5.

Figure 3:
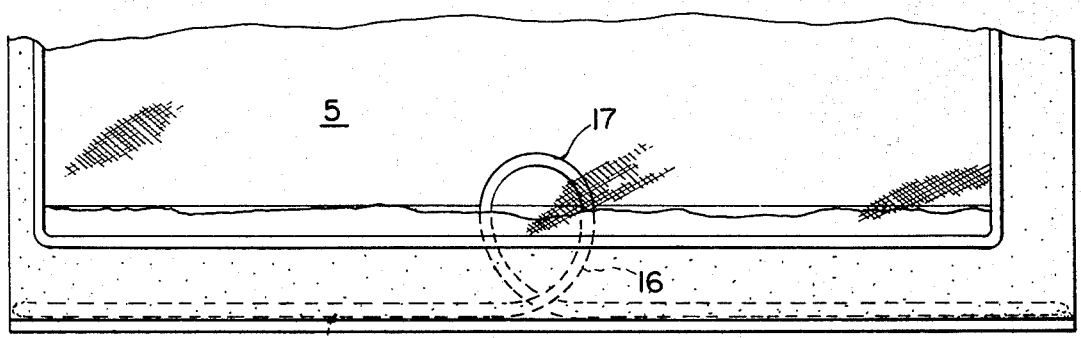
FIG. 3 shows the interior view of the connection between the frame member and end wall.
Figure 4:
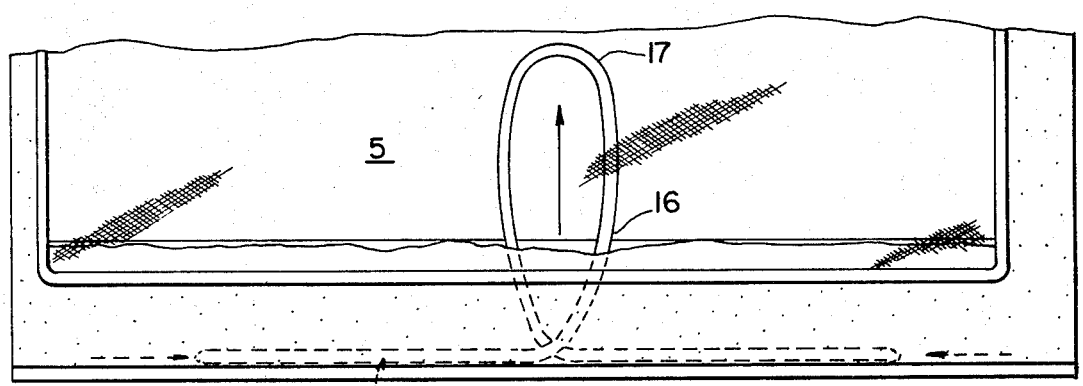
FIG. 4 is similar to FIG. 3, with the fastener element partially removed.

The flexible securing member 16 firmly holds the fabric edge 15 in the tubular slotted formation or elements 11, and is easily and quickly removed by pulling on the loop 17 in the interior of the camper, as seen in FIG. 3. The partially withdrawn flexible member is seen in FIG. 4.

Figure 5:
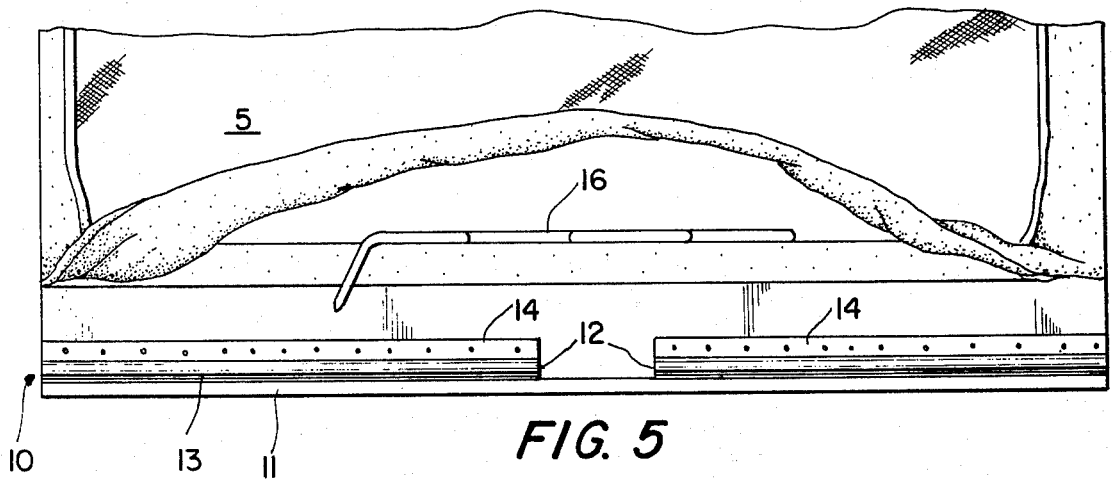
FIG. 5 shows an outside end view as FIG. 3 with the fastener removed and the fabric end wall detached to provide an escape opening.

When the flexible securing member 16 is completely removed, the fabric margin of the wall may be raised as seen in FIG. 5 to allow an occupant to escape from inside the camper.

What I claim is:

1. In a camping unit enclosed at least partially by walls and top in which a wall of flexible material extends over the outer side of a rigid frame member, a quick detachable escape fastener comprising spaced, slotted tubular formations on the outer side of said frame member, a folded edge of said wall inserted through the slots in said tubular formations, a flexible member in said folded edge portion within said tubular formations to prevent withdrawal of said edge portion through said slots, said flexible member having a central portion accessible through an opening in said edge portion on the interior side of said end wall and in space between said tubular formations, so that said flexible member may be quickly removed by a pull on said central portion.

2. In a camping unit enclosed at least partially by fabric walls and top of flexible material, and including an extension on one end having a transverse rigid frame member, and a flexible end wall having its bottom edge along the outer side of said transverse, rigid frame member, two slotted tubular elements fixed to the outer side of said transverse member and spaced apart at the center of said member, said bottom edge of said end wall having a fold forming one edge with said fold inserted in the slots of said tubular elements, said fold having an opening at its center, a flexible member extending through the folded edge within said tubular elements to prevent withdrawal of said edge through said slots, said flexible member being formed with a loop portion in the center in the space between said tubular elements and projecting through the opening in said folded edge on the inner side of said end wall on the interior of the camping unit so the flexible member may be quickly withdrawn to unfasten said fastener and allow opening of said end wall.

3. In a shelter unit, a vertical, flexible closure forming a wall portion of said unit, a solid frame member along the bottom side of said flexible closure with the bottom edge of said flexible closure folded and extending along the outer side of said frame member, fastening elements on the outer side of said frame member and spaced apart at the center of said frame member, said fastening elements receiving the edge of said flexible closure, and a securing member having end sections securing said bottom edge to said fastening elements, and movable toward the center of said frame member to release the bottom edge of said flexible closure from said fastening elements, said securing member having a central section between said fastening elements on the inner side of said flexible closure for pulling said end sections from engagement with said flexible closure to release said closure from said frame member.

4. In a shelter unit as claimed in claim 3, in which said fastening elements are tubular elements and said bottom edge has a tubular formation, said securing member being a flexible device having its end sections engaging the tubular formation of said closure to secure it to said tubular elements.

5. In a shelter unit as claimed in claim 3, in which said fastening elements are tubular elements and said edge has a tubular formation, and said securing member extends through said tubular elements and said tubular formation to secure said edge to said frame member.

* * * * *